(12) United States Patent
Iwasawa et al.

(10) Patent No.: US 11,531,092 B2
(45) Date of Patent: Dec. 20, 2022

(54) LASER SCANNING SENSOR

(71) Applicant: OPTEX Co., Ltd., Shiga (JP)

(72) Inventors: Masashi Iwasawa, Shiga (JP); Keisuke Katsumi, Shiga (JP); Seongho Cho, Shiga (JP)

(73) Assignee: OPTEX CO., LTD., Shiga (JP)

( * ) Notice: Subject to any disclaimer, the term of this patent is extended or adjusted under 35 U.S.C. 154(b) by 1034 days.

(21) Appl. No.: 16/312,386

(22) PCT Filed: Aug. 7, 2017

(86) PCT No.: PCT/IB2017/000922
§ 371 (c)(1),
(2) Date: Dec. 21, 2018

(87) PCT Pub. No.: WO2017/221071
PCT Pub. Date: Dec. 28, 2017

(65) Prior Publication Data
US 2019/0235060 A1    Aug. 1, 2019

(30) Foreign Application Priority Data
Jun. 23, 2016  (JP) .............................. JP2016-124867

(51) Int. Cl.
*G01S 7/481*    (2006.01)
*G02B 26/12*    (2006.01)
(Continued)

(52) U.S. Cl.
CPC ............ *G01S 7/4817* (2013.01); *G01S 7/484* (2013.01); *G01S 7/4865* (2013.01); *G01S 7/497* (2013.01);
(Continued)

(58) Field of Classification Search
CPC .... G02B 26/0833; G02B 26/10; G02B 26/12; G02B 26/121; G02B 26/129;
(Continued)

(56) References Cited

U.S. PATENT DOCUMENTS 4,441,126 A  *  4/1984  Greenig  ............... H04N 1/0473
                                                        348/203
5,235,454 A  *  8/1993  Iwasaki  ................ G02B 7/1821
                                                        310/90.5
(Continued)

FOREIGN PATENT DOCUMENTS

JP       H1184006 A  *  3/1999
JP       2011-022080     2/2011
(Continued)

OTHER PUBLICATIONS

International Search Report dated Sep. 12, 2017 in International (PCT) Application No. PCT/IB2017/000922.

*Primary Examiner* — Daniel L Murphy
(74) *Attorney, Agent, or Firm* — Wenderoth, Lind & Ponack, L.L.P.

(57) ABSTRACT

A laser scanning sensor includes a laser light-emitting element to emit a pulse laser beam, a light-receiving element to receive a returned reflected beam, a rotary polygon mirror having a plurality of reflecting surfaces to change the travelling direction of the pulse laser beam, and a drive motor to rotate the rotary polygon mirror in a predetermined direction. The sensor also includes an encoder to detect the rotation status of the rotary polygon mirror and to generate a reference signal and trigger signals for the respective reflecting surfaces, and a control/calculation unit to produce a projection pulse train in a specific pulse cycle after a delay time from the generation of a trigger signal for each of the reflecting surfaces, and to acquire distance information per (Continued)

pulse, based on the time after the start of emission of the pulse laser beam before the return of the reflected beam.

6 Claims, 10 Drawing Sheets

(51) Int. Cl.
| | | |
|---|---|---|
| *G01S 7/484* | (2006.01) | |
| *G01S 7/486* | (2020.01) | |
| *G01S 17/42* | (2006.01) | |
| *G01S 7/497* | (2006.01) | |
| *G02B 26/10* | (2006.01) | |
| *G01S 7/4865* | (2020.01) | |

(52) U.S. Cl.
 CPC .............. *G01S 17/42* (2013.01); *G02B 26/10* (2013.01); *G02B 26/12* (2013.01)

(58) Field of Classification Search
 CPC ... G02B 26/122; G02B 26/127; G01S 7/4817; G01S 7/484; G01S 7/4865; G01S 7/4911; G01S 7/497; G01S 17/42
 USPC ....................................................... 356/5.02
 See application file for complete search history.

(56) References Cited

U.S. PATENT DOCUMENTS

| | | |
|---|---|---|
| 2006/0169876 A1 | 8/2006 | Zambon |
| 2008/0007710 A1 | 1/2008 | Zambon |
| 2012/0113410 A1 | 5/2012 | Iwasawa et al. |
| 2014/0085695 A1* | 3/2014 | Borchers .............. G02B 26/101 359/201.2 |
| 2015/0212209 A1 | 7/2015 | Iwasawa et al. |

FOREIGN PATENT DOCUMENTS

| | | | | |
|---|---|---|---|---|
| JP | 2012-083559 | | | 4/2012 |
| JP | 2012083559 | A | * | 4/2012 |
| JP | 5283310 | | | 9/2013 |
| JP | 2014-059834 | | | 4/2014 |
| JP | 2016-070974 | | | 5/2016 |
| JP | 2016070974 | A | * | 5/2016 |

\* cited by examiner (a) first facet (b) second and following facets (c) composition of light beams reflected by respective facets (a) first facet (b) second and following facets (c) composition of light beams reflected by respective facets (a) first facet (b) second and following facets (c) composition of light beams reflected by respective facets (a) first facet (b) second and following facets (c) composition of light beams reflected by respective facets (a) first facet (b) second and following facets (c) composition of light beams reflected by respective facets (a) first facet (b) second and following facets (c) composition of light beams reflected by respective facets

LASER SCANNING SENSOR

TECHNICAL FIELD

The present invention relates to a laser scanning sensor which detects an intruder or the like by measuring the distance to an object such as a human body, based on the TOF (time-of-flight) technology that relies on the reflection of a pulse laser beam. Particularly, the present invention relates to a laser scanning sensor which utilizes a polygon mirror as projection surfaces and which ensures projection of a pulse laser beam on the projection surfaces while avoiding the influence on the irradiation/projection positions by the precision of the polygon mirror as best as possible.

BACKGROUND ART

The inventors of the present invention have proposed various laser sensors. A laser scanning sensor disclosed in PTL 1 can reliably detect a human body in the distance. When the measurement distance is limited to a relatively short range, this laser scanning sensor inhibits an unnecessary warning due to a dirty cover and can properly give a warning even if the entire cover is unevenly blurred. A laser scanning sensor disclosed in PTL 2 can eliminate or correct undesirable influences on the laser beam during outdoor use in bad weather as best as possible, and can improve the detection precision of an intruder or the like in thick fog, heavy rain, heavy snow, etc. than the conventional products.

Such a laser scanning sensor is equipped with a laser range finder for scanning a target area in various distance measurement directions (angles). As an example of the scanner mechanism, PTL 3 proposes a laser scanner device using a polygon mirror (a rotary polygon mirror).

A laser scanner device 10 disclosed in PTL 3 includes a transmitter deflection means 20 and a receiver deflection means 24. The transmitter deflection means 20 re-directs a transmitted beam 14 emitted from a pulse source 12 toward a surveillance area. The receiver deflection means 24 reflects a received beam 22 of light pulses returning from the surveillance area, and re-directs the light beam toward a photodetector means 42.

The transmitter deflection means 20 is embodied as a rotating mirror element having four flat mirror facets 20-1, 20-2, 20-3, and 20-4, and is configured to rotate about a rotation axis 36 that extends substantially perpendicular to the transmitted beam 14. The receiver deflection means 24 is embodied as a rotating mirror element having four flat mirror facets 24-1, 24-2, 24-3, and 24-4, and is configured to rotate in synchronism with the transmitter deflection means 20 about the common rotation axis 36 that is also a rotation axis of the transmitter deflection means 20.

In the embodiments shown in FIG. 1 and FIG. 2, this laser scanner device 10 sweeps the transmitted pulses across a single sweep sector in a single sweep plane. On the other hand, in the embodiment shown in FIG. 3, the transmitter deflection means 20 and the receiver deflection means 24 may be embodied in such a manner as to tilt the sweep plane at gradually incrementing tilt angles such that the transmitted pulses are swept across a plurality of different sweep sectors in different sweep planes in the surveillance area. In this case, a scanned area 59 has a certain scanning width 60 as shown in FIG. 3, FIG. 7A, etc.

In order to keep the projection/irradiation surfaces on the facets aligned, it is inevitable to provide a high-precision encoder for detecting the rotation of the polygon mirror and to enhance precision of the polygonal surfaces. However, a pursuit for higher precision results in different problems such as a higher cost (for example, due to application of aluminum cutting or the like) and makes mass-production difficult. Although the polygon mirror may be made of molded pieces in consideration of cost effectiveness and mass-productivity, its surface precision is critically inferior to the case of metal cutting, rendering the polygon mirror impractical except when the facets are used independently.

CITATION LIST

Patent Literature

[PTL 1] JP 2011-022080 A
[PTL 2] JP 2014-059834 A
[PTL 3] JP 5283310 B2

SUMMARY OF INVENTION

Technical Problem

A polygon mirror made of molded pieces may have distortion on the facets due to molding conditions or other factors, making surface precision on the facets uneven. Besides, molds in itself cannot achieve required precision.

When continuous pulses are emitted to polygonal surfaces, inferior precision and distortion in the polygonal surfaces cause a problem. Specifically, even if the start timing of the projection is aligned on these polygonal surfaces, uneven precision and different degrees of distortion on these surfaces hamper alignment of the projection/irradiation surface at certain intervals. This is why the polygon mirror made of molded pieces cannot be used in surface composition.

Further, the polygon mirror made of molded pieces is serviceable when the polygonal surfaces constitute separate projection/irradiation areas, but is unrealistic when the polygonal surfaces are required to constitute a single surface (line).

One solution is to improve surface precision of the polygon mirror. However, higher precision requires metal cutting of aluminum or the like, which is disadvantageous in terms of cost and impractical in mass production.

An object of the present invention, made in view of these conventional problems, is to provide a laser scanning sensor which utilizes a polygon mirror as projection surfaces and which ensures projection of a pulse laser beam on the projection surfaces while avoiding the influence on the irradiation/projection positions by the precision of the polygon mirror as best as possible.

Solution to Problem

In order to achieve the above object, a laser scanning sensor according to an aspect of the present invention includes: a light-emitting element configured to emit a pulse laser beam; a light-receiving element configured to receive a reflected beam of the pulse laser beam reflected by at least one or more objects; a rotary polygon mirror having a plurality of reflecting surfaces configured to change a travelling direction of the pulse laser beam; a driving part configured to rotate the rotary polygon mirror; a rotation detecting part configured to detect a rotation status of the rotary polygon mirror and to generate, per rotation, at least one reference signal, and at least one trigger signal for each of the reflecting surfaces; and a control/calculation part configured to control the driving part, to produce a projection pulse train for driving the light-emitting element in a predetermined specific pulse cycle after passage of a delay time counted from the generation of the trigger signal for each of the reflecting surfaces that follows the generation of the reference signal, and to acquire information on a distance to the object, per each pulse of the pulse laser beam, based on a time after the start of emission of the pulse laser beam before the return of the reflected beam to the light-receiving element, wherein the delay time is set independently for each of the reflecting surfaces. Further, the specific pulse cycle may be set for each of the reflecting surfaces.

The rotary polygon mirror (the polygon mirror) may also have a plurality of reflecting surfaces configured to change a light-receiving direction at the light-receiving element. The rotation detecting part may utilize, for example, a slit and a slit group formed in a disc that rotates with the rotary polygon mirror, and a photointerrupter or the like, but is not limited to this configuration.

For each reflecting surface of the rotary polygon mirror, the start timing of the beam projection is set by the rotation detecting part. Even when the start timing on one of the reflecting surfaces is not in coordination with the timing on the other reflecting surfaces, the laser scanning sensor configured as above can align the pulse laser beams on the actual irradiation surface.

The laser scanning sensor according to the above-mentioned aspect of the present invention may further include a storage part configured to store the delay time and the specific pulse cycle. The sensor may be configured to obtain the delay time for each of the reflecting surfaces by subtracting a measured time lag from an initial delay time and to store the obtained delay time in the memory part, the measured time lag being a difference between a generation time of the trigger signal and a trigger reference time that comes when a standard time lag for each of the reflecting surfaces has passed since the generation of the reference signal. Further, the sensor may be configured to obtain the delay time for each of the reflecting surfaces by subtracting the measured time lag from the delay time stored in the memory part and to store the obtained delay time in the memory part as a latest delay time, the measured time lag being a difference between the generation time of the trigger signal and the trigger reference time that comes when the standard time lag for each of the reflecting surfaces has passed since the generation of the reference signal.

The laser scanning sensor according to the above-mentioned aspect of the present invention may be configured to adjust the pulse cycle for each of the reflecting surfaces, using a value obtained by a division wherein a difference between the delay times before and after the adjustment to align a trailing end of an irradiation position of the pulse laser beam is divided by the number of pulses in the projection pulse train.

The thus configured laser scanning sensor, in which the start timing of the beam projection on each reflecting surface of the rotary polygon mirror is set by the rotation detecting part, can align the pulse laser beams on the actual irradiation surface, even when the start timing of the beam projection on one of the reflecting surfaces of the rotary polygon mirror is not in coordination with the timing on the other reflecting surfaces or when any of the reflecting surfaces has a curve or other unevenness.

Advantageous Effects of Invention

The laser scanning sensor according to the above-mentioned aspect of the present invention, in which the start timing of the beam projection on each reflecting surface of the rotary polygon mirror is set by the rotation detecting part, can align the pulse laser beams on the actual irradiation surface, even when the start timing of the beam projection on one of the reflecting surfaces of the rotary polygon mirror is not in coordination with the timing on the other reflecting surfaces or when any of the reflecting surfaces has a curve or other unevenness.

DESCRIPTION OF EMBODIMENTS

Some embodiments according to the present invention are hereinafter described with reference to the drawings.

First Embodiment 1.1 Schematic Configuration

Figure 1:
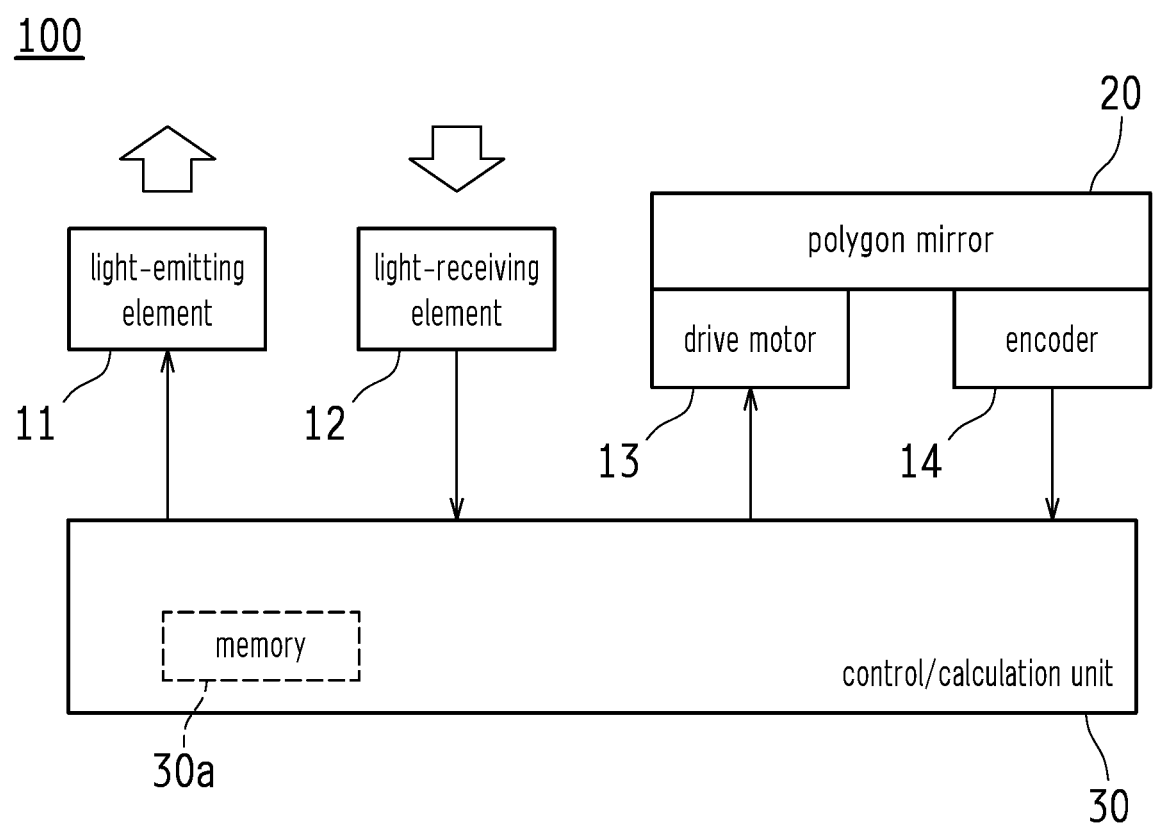
FIG. 1 is a block diagram showing a schematic configuration of a laser scanning sensor 100 according to First Embodiment of the present invention.
Figure 2:
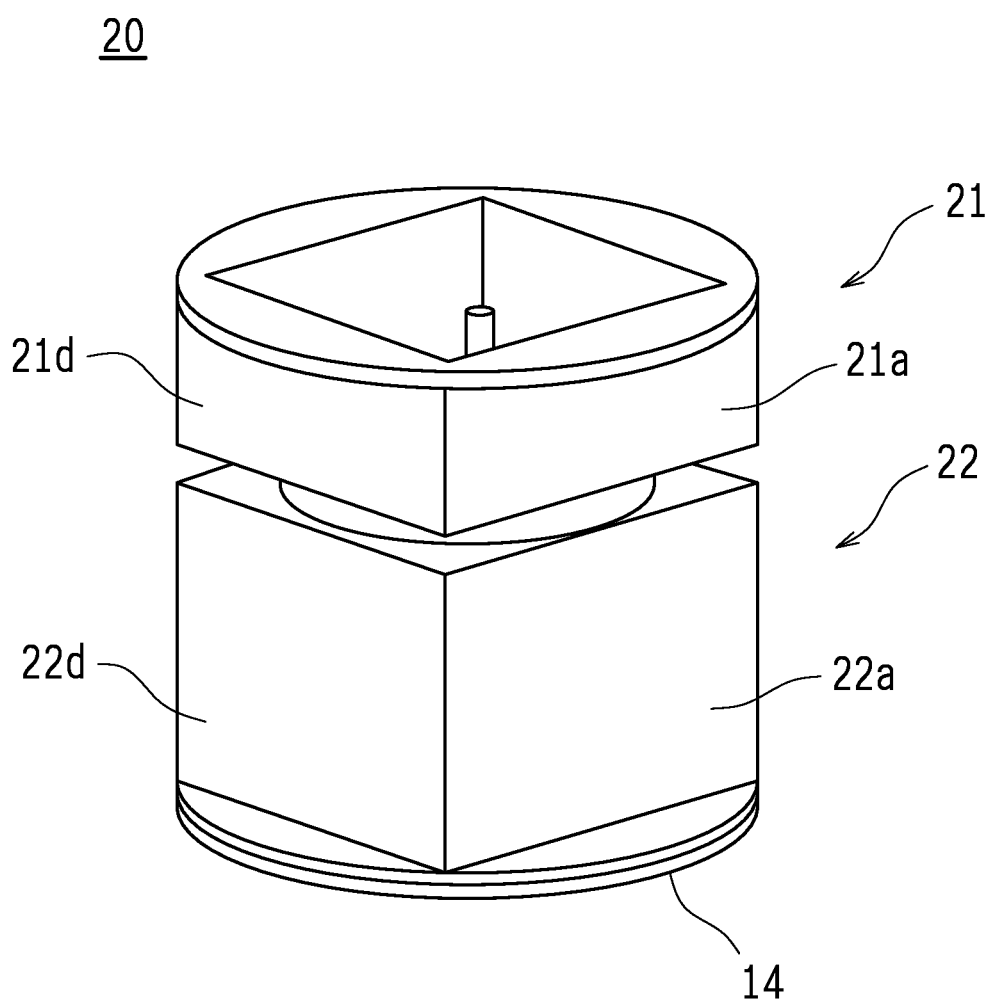
FIG. 2 is a schematic perspective view of a polygon mirror 20 built in the laser scanning sensor 100.
Figure 3:
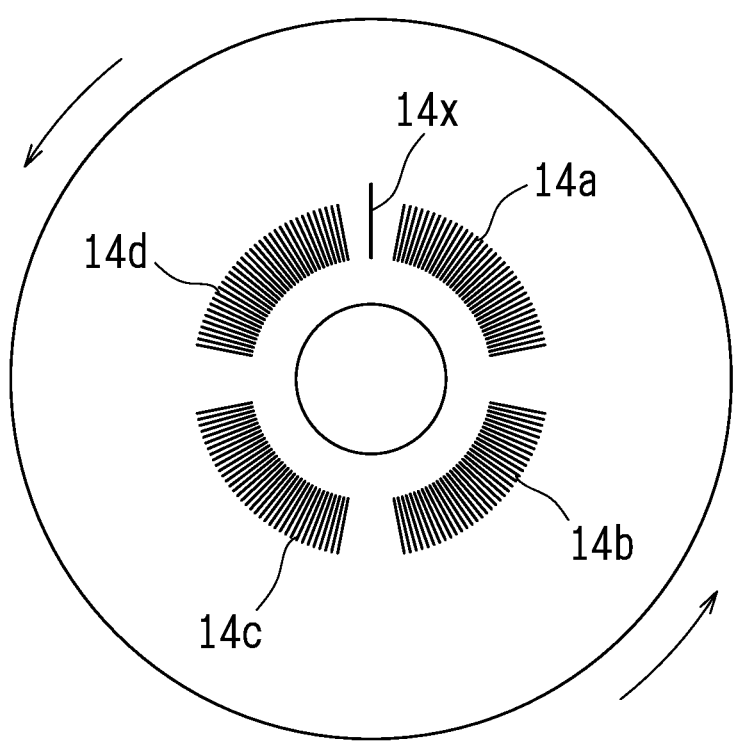
FIG. 3 is a schematic plan view of an encoder 14 attached to the bottom of the polygon mirror 20 to detect the rotation status of the polygon mirror 20.

FIG. 1 is a block diagram showing a schematic configuration of a laser scanning sensor 100 according to an embodiment of the present invention. FIG. 2 is a schematic perspective view of a polygon mirror 20 built in the laser scanning sensor 100. FIG. 3 is a schematic plan view of an encoder 14 attached to the bottom of the polygon mirror 20 to detect the rotation status of the polygon mirror 20.

As shown in FIG. 1, the laser scanning sensor 100 includes a laser light-emitting element 11 configured to emit a pulse laser beam, a light-receiving element 12 configured to receive a pulse laser beam reflected by an object such as a human body and returning to the light-receiving element 12, a polygon mirror 20 configured to change the travelling direction of the pulse laser beam and the receiving direction by the light-receiving element 12, a drive motor 13 configured to rotate the polygon mirror 20 in a predetermined direction, an encoder 14 configured to detect the rotation status of the polygon mirror 20, and a control/calculation unit 30 connected to these components, configured to conduct control, calculation, etc., and having a memory 30a.

The laser light-emitting element 11 may be, for example, a semiconductor laser diode (LD) or the like, but is not limited thereto.

The light-receiving element 12 may be, for example, an avalanche photodiode (APD) or the like, but is not limited thereto.

A pulse laser beam emitted from the laser light-emitting element 11 reaches, and is reflected by, an external object such as a human body. A part of the beam reflected by the object returns and reaches the light-receiving element 12. For each pulse of the pulse laser beam, a micro time after a pulse is emitted from the laser light-emitting element 11 before the reflected beam reaches the light-receiving element 12 is measured precisely so as to obtain distance data to the object such as a human body.

As the general characteristics, the TOF laser distance measurement ensures precise measurement up to a considerably long distance, for example, up to tens of meters at the maximum, or even longer in some situations.

As shown in FIG. 2, the polygon mirror 20 is composed of a light-emitting mirror part 21 and a light-receiving mirror part 22. The light-emitting mirror part 21 has four flat, horizontally rectangular mirror sections 21a, 21b, 21c, 21d (21b and 21c are hidden in FIG. 2) arranged in this order to have a square cross section, with their facets facing outward. The light-receiving mirror part 22 has four flat, substantially square mirror sections 22a, 22b, 22c, 22d (22b and 22c are hidden in FIG. 2) arranged in this order to have a square cross section, with their facets facing outward. The light-emitting mirror part 21 and the light-receiving mirror part 22 have the same rotation axis. The mirror sections 21a, 21b, 21c, 21d are parallel to the mirror sections 22a, 22b, 22c, 22d, respectively.

The polygon mirror 20 is driven by the drive motor 13 and spins in a predetermined direction at a fixed, very high speed. A pulse laser beam emitted from the laser light-emitting element 11 is reflected by any of the mirror sections 21a, 21b, 21c, 21d of the light-emitting mirror part 21, and changes its travelling direction. When the pulse laser beam is reflected by an object such as a human body, a part of the reflected light returns to the polygon mirror 20, is reflected by any of the mirror sections 22a, 22b, 22c, 22d of the light-receiving mirror part 22, and reaches the light-receiving element 12. For example, when the pulse laser beam is reflected by the mirror section 21a, the returned beam is reflected by the mirror section 22a that corresponds to the mirror section 21a.

The polygon mirror 20 is spinning at such a high speed that the orientations of the mirror sections 21a, 21b, 21c, 21d are changing little by little, even in one emission cycle of the pulse laser beam. In other words, the direction of the reflected pulse laser beam changes for every pulse at a fixed angular interval, so that the pulse laser beam can be emitted for scanning over a wide angular range at a fixed angular interval.

As shown in FIG. 3, the encoder 14 is a substantially annular metal plate having a small circular bore in the center. The encoder 14 rotates with the polygon mirror 20, for example, in the counterclockwise direction.

The encoder 14 is provided with a slit 14x for generating one pulse per rotation, as a reference signal, by a photointerrupter or the like (not shown) and slit portions 14a-14d for generating trigger signals. The slit portions 14a-14d correspond to the facets (the mirror sections 21a-21d) of the light-emitting mirror part 21 of the polygon mirror 20, respectively. The slit portions 14a-14d may be a slit group for generating not only trigger signals but also pulse signal trains for driving the laser light-emitting element 11. In this case, the first pulse in each pulse signal train may also serve as a trigger signal. For example, the slit portion 14a corresponds to the mirror section 21a and generates a pulse signal train containing a trigger signal.

The control/calculation unit 30, for example, controls emission from the laser light-emitting element 11, measures and records the return time of the reflected beam, controls the rotation of the drive motor 13, and monitors a detection signal from the encoder 14. The control/calculation unit 30 may be, but is not limited to, a dedicated hardware circuit or a control-program-rewritable high-speed calculation unit.

The control/calculation unit 30 can assume that the first pulse signal train detected after a reference signal generated by the slit 14x is a pulse signal train generated by the slit portion 14a. Using the first pulse signal in this pulse signal train as a trigger, the control/calculation unit 30 starts to output a projection pulse train for driving the laser light-emitting element 11. For example, to output 380 pulses in the range of 90 degrees, each pulse is generated at about 0.25-degree interval.

Regarding the actual output of the projection pulse train, the pulses may be produced simply in accordance with the slits in the slit portion 14a, or may be produced in a predetermined specific pulse cycle (at a fixed time interval) that has been set in advance according to time management by the control/calculation unit 30. The present embodiment adopts the latter manner, which is not affected by positional errors of the slits formed in the slit portion 14a and differences from the other slit portions 14b-14d. In this case, the slit portions 14a-14d may omit any slits other than their first slits.

After the output of the projection pulse train triggered by the pulse signal train by the slit portion 14a has ended, the control/calculation unit 30 can assume that the pulse signal train detected next is a pulse signal train generated by the slit portion 14b. Using the first pulse signal in this pulse signal train as a trigger, the control/calculation unit 30 starts to output a projection pulse train for driving the laser light-emitting element 11. Similarly, regarding the actual output of the projection pulse train, the pulses may be produced simply in accordance with the pulses in the pulse signal train generated by the slit portion 14b, or the second and following projection pulses may be produced in a specific pulse cycle.

The same description applies to the slit portions 14c and 14d.

1.2 If Trigger Points on the Facets are Aligned

Figure 4:
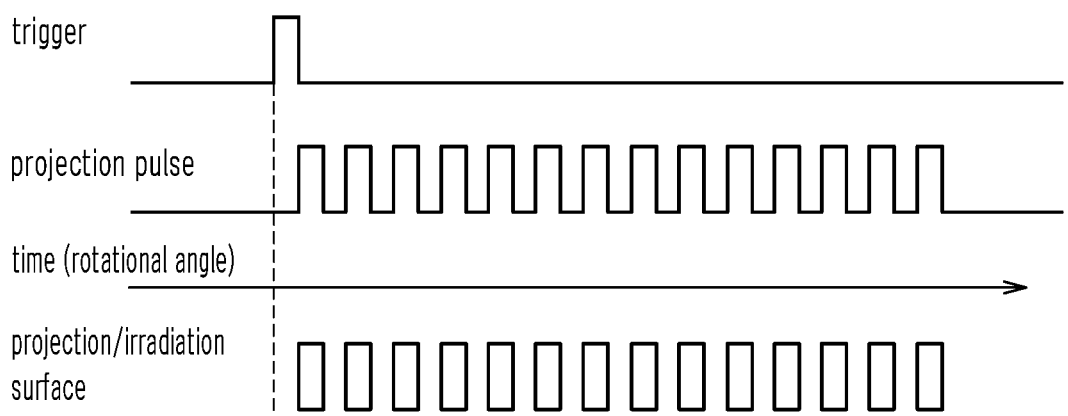
FIGS. 4(a)-4(c) are schematic diagrams showing the trigger timing, the pulse projection timing, the elapsed time (rotational angle), the positional relationship on the projection/irradiation surface, etc., in the case where the trigger points on the facets of the light-emitting mirror part 21 of the polygon mirror 20 are aligned with each other.
Figure 4:
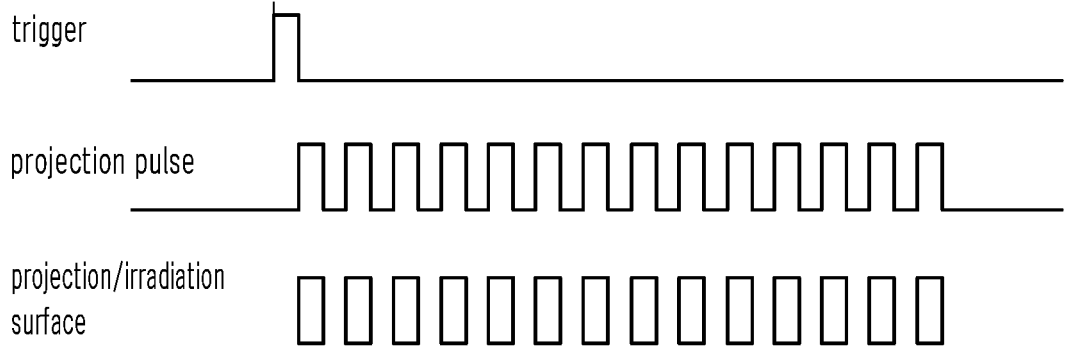
Figure 4:
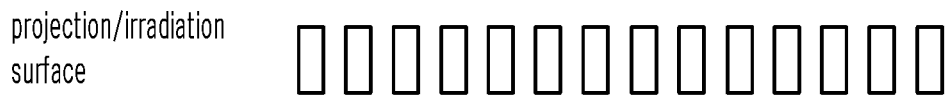

FIGS. 4(*a*)-4(*c*) are schematic diagrams showing the trigger timing, the pulse projection timing, the elapsed time (rotational angle), the positional relationship on the projection/irradiation surface, etc., in the case where the trigger points on the facets of the light-emitting mirror part 21 of the polygon mirror 20 are aligned with each other. As the pulse signal train containing a trigger, only the first pulse signal is illustrated, and the second and following signals are omitted (the same applies to the following drawings).

As shown in FIG. 4(*a*), when the control/calculation unit 30 detects the first pulse signal in the pulse signal train corresponding to a first facet (the mirror section 21a), the control/calculation unit 30 uses this signal as a trigger and starts to output a projection pulse train for driving the laser light-emitting element 11 in a specific pulse cycle. In other words, a light beam of the pulse laser beam irradiates the projection/irradiation surface at given intervals.

FIG. 4(*b*) concerns the second and following facets (the mirror sections 21b-21d), where their trigger points are aligned with the one on the first facet. When the control/calculation unit 30 detects the first pulse signals in the respective pulse signal trains, the control/calculation unit 30 uses these signals as triggers and similarly starts to output the projection pulse trains for driving the laser light-emitting element 11 in the specific pulse cycle. In other words, a light beam of the pulse laser beam irradiates the projection/irradiation surface also at given intervals.

When the light beams of the pulse laser beam reflected by the respective facets are composed on the projection/irradiation surface, the light beams are supposed to match exactly as shown in FIG. 4(*c*).

1.3 If Trigger Points on the Second and Following Facets are Delayed

Figure 5:
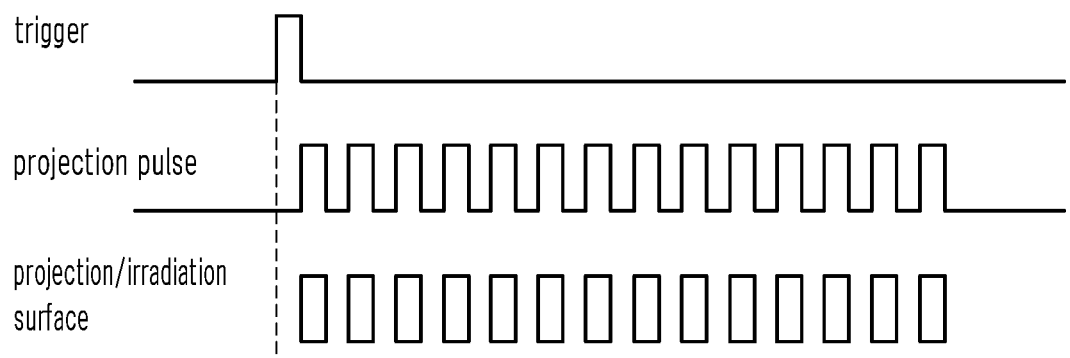
FIGS. 5(a)-5(c) are schematic diagrams showing the trigger timing, the pulse projection timing, the elapsed time (rotational angle), the positional relationship on the projection/irradiation surface, etc., in the case where the trigger points on the second and following facets of the light-emitting mirror part 21 of the polygon mirror 20 are delayed.
Figure 5:
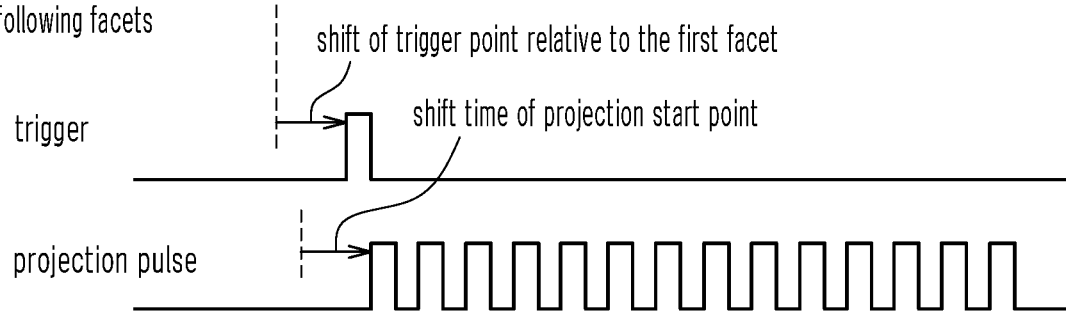
Figure 5:
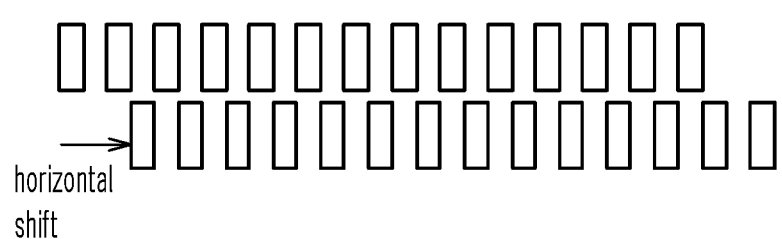

FIGS. 5(*a*)-5(*c*) are schematic diagrams showing the trigger timing, the pulse projection timing, the elapsed time (rotational angle), the positional relationship on the projection/irradiation surface, etc., in the case where the trigger points on the second and following facets of the light-emitting mirror part 21 of the polygon mirror 20 are delayed.

The first facet (the mirror section 21a), as shown in FIG. 5(*a*), has the same pattern as the one in FIG. 4(*a*).

On the other hand, in FIG. 5(*b*), the trigger points on the second and following facets (the mirror sections 21b-21d) are delayed from their timing (trigger reference times at the respective facets), which comes when standard time lags for the respective facets have passed since the generation of the reference signal (wherein the standard time lags are calculated with reference to the relative positional relationship of the slit 14x and each of the slit portions 14a-14d, and the rotation speed of the encoder 14). The delayed trigger points also delay the start of the output of the projection pulse trains by the control/calculation unit 30.

Eventually, when light beams of the pulse laser beam reflected on the respective facets are composed on the projection/irradiation surface, the beams are horizontally shifted, as shown in FIG. 5(*c*). In FIG. 5(*c*), light beams for different facets are vertically shifted for clarity, but no vertical shift occurs actually.

If the trigger points on the second and following facets are advanced (earlier in time) relative to the trigger point on the first facet, the trigger points are adjustable (in terms of rotational angle) by a delay process for delaying the start of the output of the projection pulse trains in the advanced facets. However, the delayed trigger points on the second and following facets, as shown in FIG. 5(*b*), are not adjustable because the delay time cannot be a negative value.

1.4 If a Delay Process is Conducted After a Trigger on Each Facet Before the Start of the Output of the Corresponding Projection Pulse Train As a solution, the output of the projection pulse train is arranged not to start immediately after the trigger on each facet, and an initial delay time is set in advance for each facet. The initial delay time for each facet is greater than an expected delay time from the first facet serving as the reference surface. On each facet, an actual trigger shift time is counted (measured) and subtracted from the delay time (the initial delay time) for each facet to cancel out the time lag of the trigger point on each facet.

Figure 6:
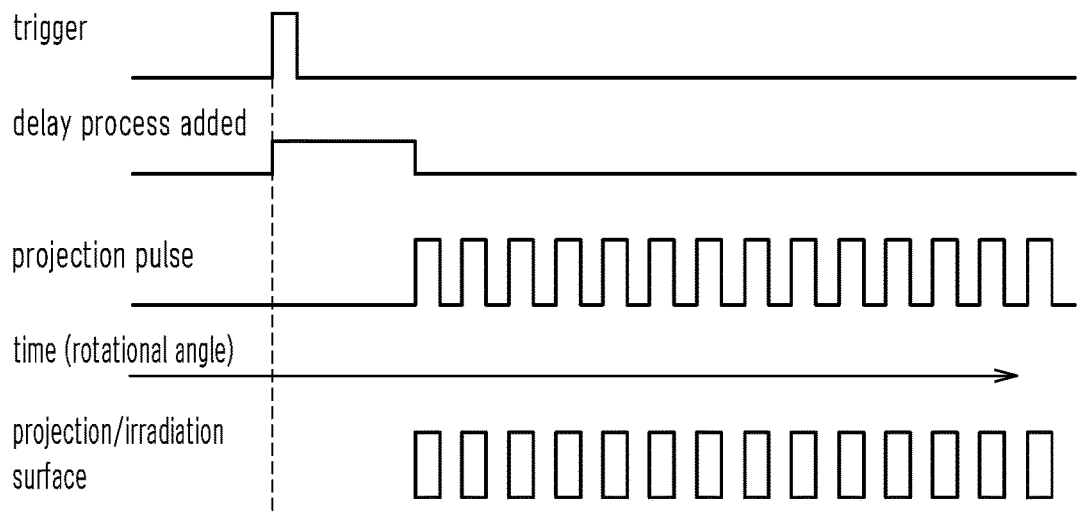
FIGS. 6(a)-6(c) are schematic diagrams showing the trigger timing, the pulse projection timing, the elapsed time (rotational angle), the positional relationship on the projection/irradiation surface, etc., in the case where the trigger points on the facets of the light-emitting mirror part 21 of the polygon mirror 20 are aligned with each other, and where a delay process is conducted after the trigger on each facet before the start of the output of the projection pulse train.
Figure 6:
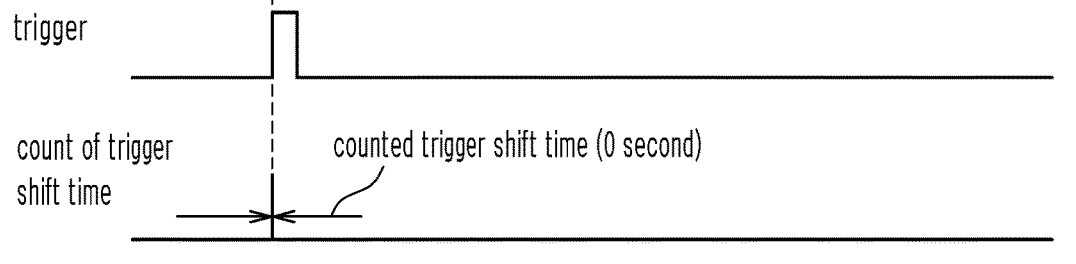
Figure 6:
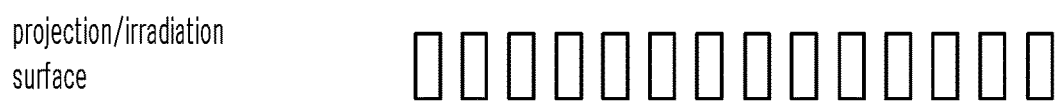

FIGS. 6(*a*)-6(*c*) are schematic diagrams showing the trigger timing, the pulse projection timing, the elapsed time (rotational angle), the positional relationship on the projection/irradiation surface, etc., in the case where the trigger points on the facets of the light-emitting mirror part 21 of the polygon mirror 20 are aligned with each other, and where a delay process is conducted after the trigger on each facet before the start of the output of the projection pulse train.

As shown in FIGS. 6(*a*) and 6(*b*), the trigger points on the facets are inherently aligned with each other. On each facet, the trigger shift time is 0 second, and the delay time from the trigger before the start of the output of the projection pulse train remains to be the initial delay time.

Therefore, when light beams of the pulse laser beam reflected by the respective facets are composed on the projection/irradiation surface, the light beams are supposed to match exactly as shown in FIG. 6(*c*).

Figure 7:
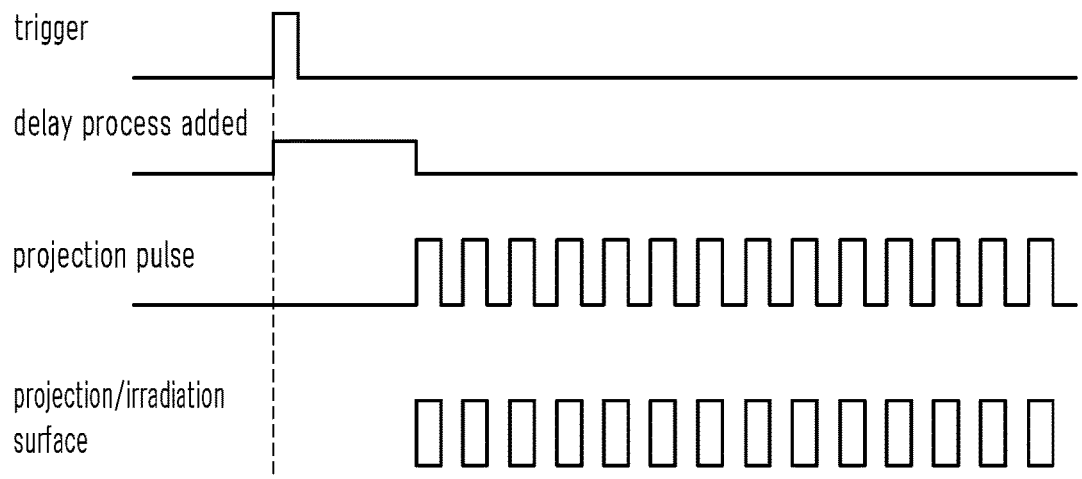
FIGS. 7(a)-7(c) are schematic diagrams showing the trigger timing, the pulse projection timing, the elapsed time (rotational angle), the positional relationship on the projection/irradiation surface, etc., in the case where the trigger points on the second and following facets of the light-emitting mirror part 21 of the polygon mirror 20 are delayed, and where a delay process is conducted after the trigger on each facet before the start of the output of the projection pulse train.
Figure 7:
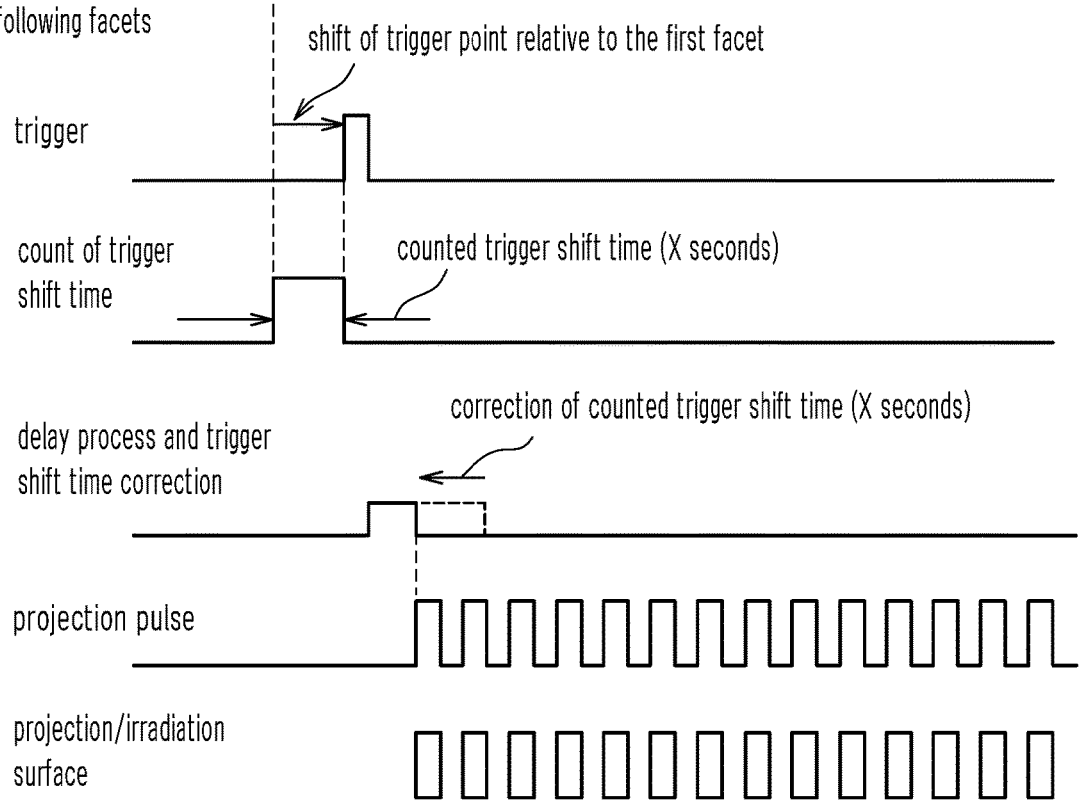
Figure 7:
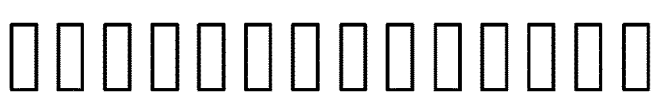

FIGS. 7(*a*)-7(*c*) are schematic diagrams showing the trigger timing, the pulse projection timing, the elapsed time (rotational angle), the positional relationship on the projection/irradiation surface, etc., in the case where the trigger points on the second and following facets of the light-emitting mirror part 21 of the polygon mirror 20 are delayed, and where a delay process is conducted after the trigger on each facet before the start of the output of the projection pulse train.

The first facet (the mirror section 21a), as shown in FIG. 7(*a*), has the same pattern as the one in FIG. 6(*a*).

On the other hand, the trigger points on the second and following facets (the mirror sections 21b-21d) are delayed from their timing (trigger reference times at the respective facets), which comes when standard time lags for the respective facets have passed since the generation of the reference signal. In this case, the trigger shift time (X seconds) is counted as shown in FIG. 7(b), and the delay time for each facet is corrected according to the following formula.

Delay time←Delay time (initial delay time)−Trigger shift time (counted time)

As a result, even if the trigger points on these facets are delayed by the trigger shift time from the same timing as on the first facet, passage of the corrected delay time according to the above formula brings the substantial delay time for these facets equal to the initial delay time.

When the light beams of the pulse laser beam reflected by the respective facets are composed on the projection/irradiation surface, the light beams are supposed to match exactly at least at the leading end as shown in FIG. 7(c).

As described above, the delay time after the trigger before the start of the output of the projection pulse train is properly set for each facet of the light-emitting mirror part 21 of the polygon mirror 20. Eventually, even if a projection starting trigger on a facet of the polygon mirror 20 set by the encoder 14 or the like is not aligned with the projection starting triggers of the other facets, the light beams can match with each other on the actual projection/irradiation surface.

The delay time in each facet may be set in a pre-shipment adjustment process or a like process at the factory. At the factory, the trigger shift time for each facet may be counted by the control/calculation unit 30, subtracted from the initial delay time, and stored in the memory in the control/calculation unit 30. Later in normal use, the delay time for each facet may be retrieved from the memory.

During use, the preset trigger timing may be changed, for example, by an external factor (e.g., an impact by a fall or the like) that offsets the shaft of the drive motor 13 or affects otherwise, and may shift the projection/irradiation timing or shift the positions of the light beam on the projection/irradiation surface. Hence, also during normal use, it is also possible to subtract the trigger shift time counted by the control/calculation unit 30 from the delay time for each facet stored in the memory, to apply the corrected delay time, and to update the memory (to store the corrected delay time as the latest delay time). In this manner, the shift of the trigger timing for each facet due to an external factor or the like can be automatically corrected.

Second Embodiment

Second Embodiment modifies the control conducted by the control/calculation unit 30, but the other configurations are basically the same as First Embodiment.

As described above, First Embodiment aligns the leading ends of the light beams on the projection/irradiation surface by coordinating the start timing of the output of the projection pulse train (the projection start points) in the facets of the light-emitting mirror part 21 of the polygon mirror 20 with each other. If at least one facet of the light-emitting mirror part 21 is curved or otherwise uneven, however, the trailing ends of the light beams on the projection/irradiation surface may not be aligned with each other.

Figure 8:
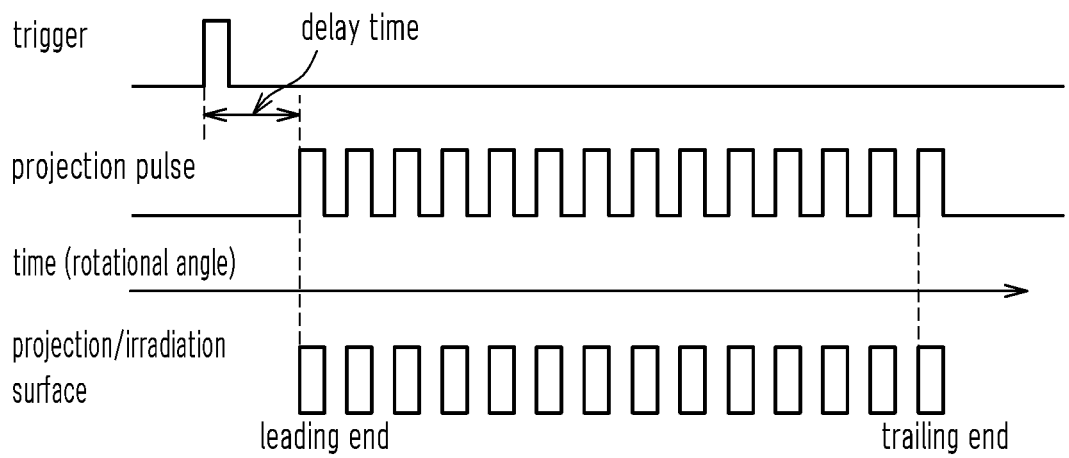
FIGS. 8(a)-8(c) are schematic diagrams showing the trigger timing, the pulse projection timing, the elapsed time (rotational angle), the positional relationship on the projection/irradiation surface, etc., in the case where the projection start points on the facets of the light-emitting mirror part 21 of the polygon mirror 20 are brought into alignment with each other by a delay process conducted after the trigger on each facet before the start of the output of the projection pulse train, and where no facet is curved or otherwise uneven.
Figure 8:
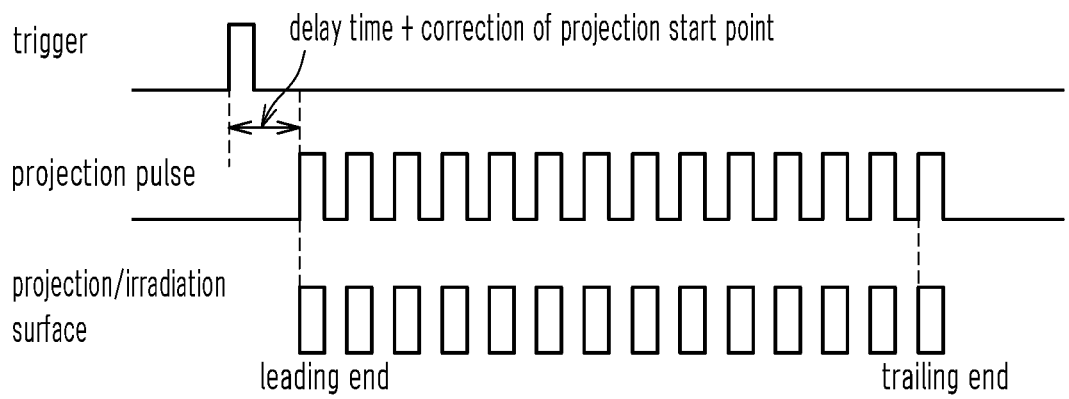
Figure 8:
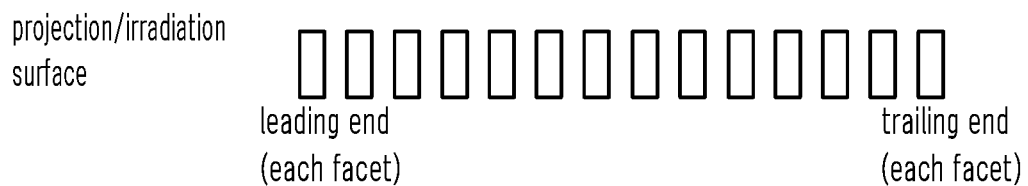

2.1 How a Curve or Other Unevenness on a Facet Affects Light Beam Positions on the Projection/Irradiation Surface FIGS. 8(a)-8(c) are schematic diagrams showing the trigger timing, the pulse projection timing, the elapsed time (rotational angle), the positional relationship on the projection/irradiation surface, etc., in the case where the projection start points on the facets of the light-emitting mirror part 21 of the polygon mirror 20 are brought into alignment with each other by a delay process conducted after the trigger on each facet before the start of the output of the projection pulse train, and where no facet is curved or otherwise uneven.

The first facet (the mirror section 21a), as shown in FIG. 8(a), has the same pattern as the one in FIG. 7(a).

The second and following facets (the mirror sections 21b-21d), as shown in FIG. 8(b), also have the same pattern as the one in FIG. 7(b).

Therefore, when the light beams of the pulse laser beam reflected by the respective facets are composed on the projection/irradiation surface, the light beams are supposed to match exactly as shown in FIG. 8(c) which is similar to FIG. 7(c).

Figure 9:
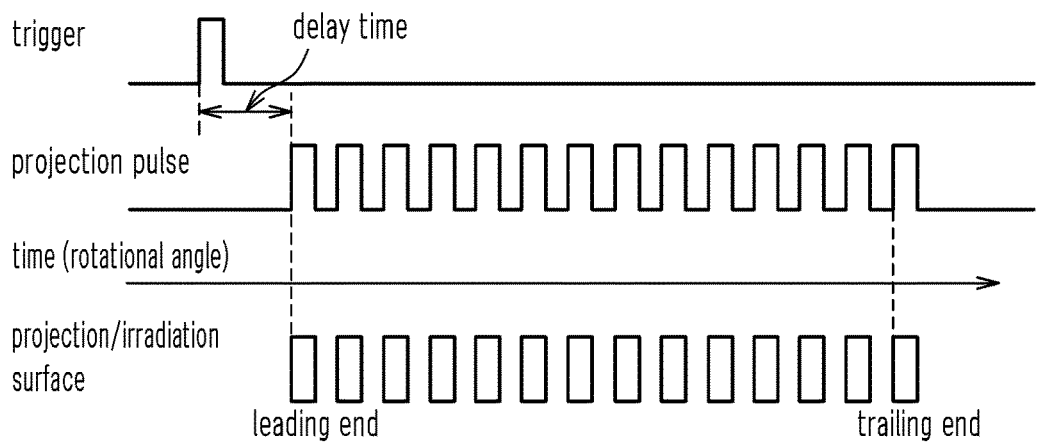
FIGS. 9(a)-9(c) are schematic diagrams showing the trigger timing, the pulse projection timing, the elapsed time (rotational angle), the positional relationship on the projection/irradiation surface, etc., in the case where the projection start points on the facets of the light-emitting mirror part 21 of the polygon mirror 20 are brought into alignment with each other by a delay process conducted after the trigger on each facet before the start of the output of the projection pulse train, and where at least one facet is curved or otherwise uneven.
Figure 9:
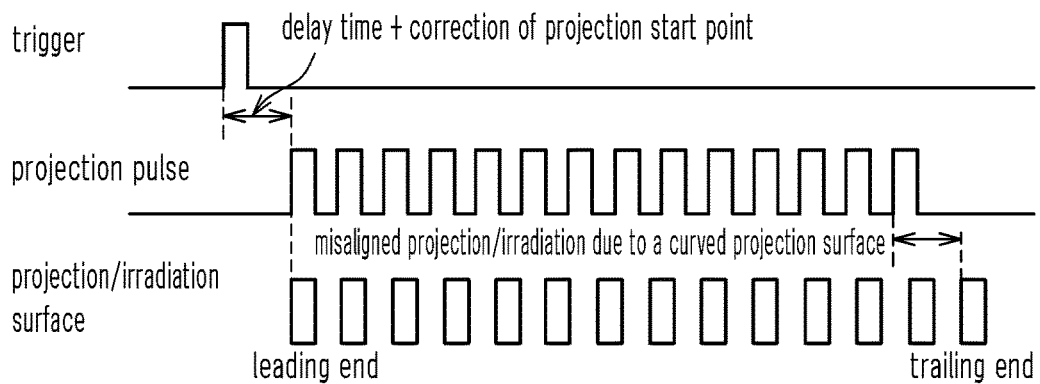
Figure 9:
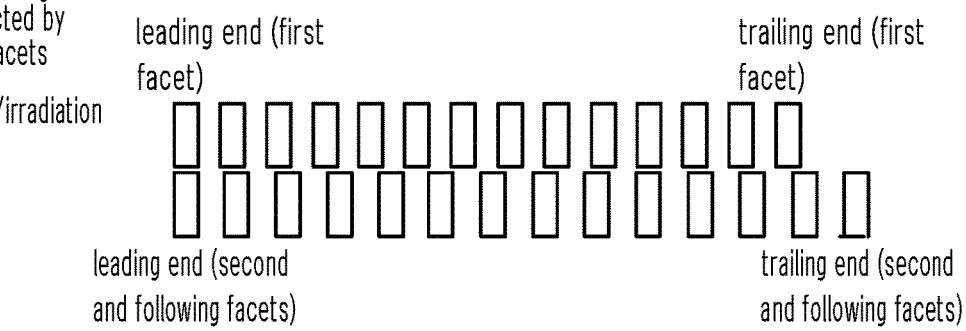

FIGS. 9(a)-9(c) are schematic diagrams showing the trigger timing, the pulse projection timing, the elapsed time (rotational angle), the positional relationship on the projection/irradiation surface, etc., in the case where the projection start points on the facets of the light-emitting mirror part 21 of the polygon mirror 20 are brought into alignment with each other by a delay process conducted after the trigger on each facet before the start of the output of the projection pulse train, and where at least one facet is curved or otherwise uneven.

If the first facet (the mirror section 21a) is not curved, the first facet shown in FIG. 9(a) has the same pattern as the one in FIG. 8(a).

FIG. 9(b) concerns the case where any of the second and following facets (the mirror sections 21b-21d) is curved. Even though the projection start point and the projection end point of the projection pulse train on the curved facet are the same as the respective points on the first facet, the position of the trailing end of the light beam on the projection/irradiation surface may be different from the corresponding position on the first facet.

Eventually, when the light beams of the pulse laser beam reflected by the respective facets are composed on the projection/irradiation surface, the trailing ends may not be aligned with each other, as shown in FIG. 9(c). Similar to FIG. 5(c), the light beams for different facets are vertically shifted for clarity, but no vertical shift occurs actually.

2.2 Measures Against a Curve or Unevenness on a Facet

Figure 10:
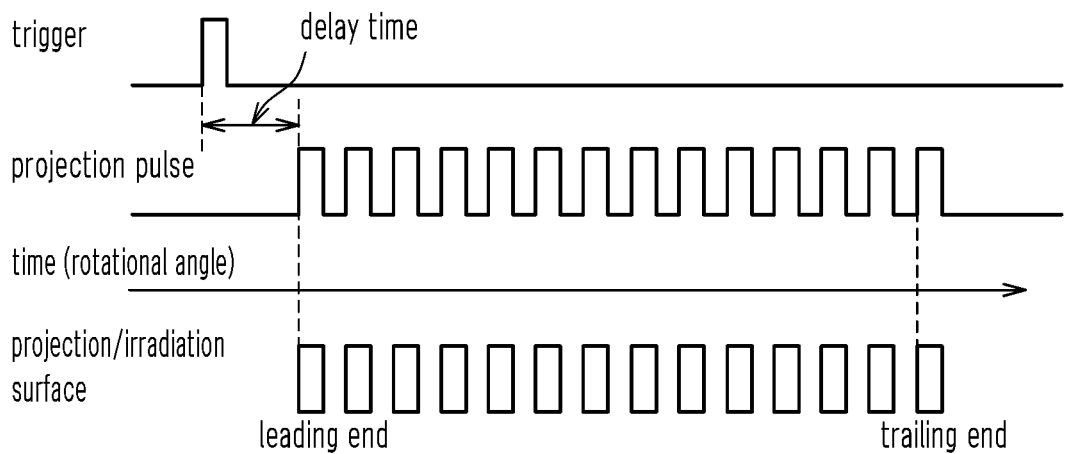
FIGS. 10(a)-10(c) are schematic diagrams showing the trigger timing, the pulse projection timing, the elapsed time (rotational angle), the positional relationship on the projection/irradiation surface, etc., in the case where the projection start points on the facets of the light-emitting mirror part 21 of the polygon mirror 20 are brought into alignment with each other by a delay process conducted after the trigger on each facet before the start of the output of the projection pulse train, where at least one facet is curved or otherwise uneven, and where the pulse cycle of the projection pulse train is changed.
Figure 10:
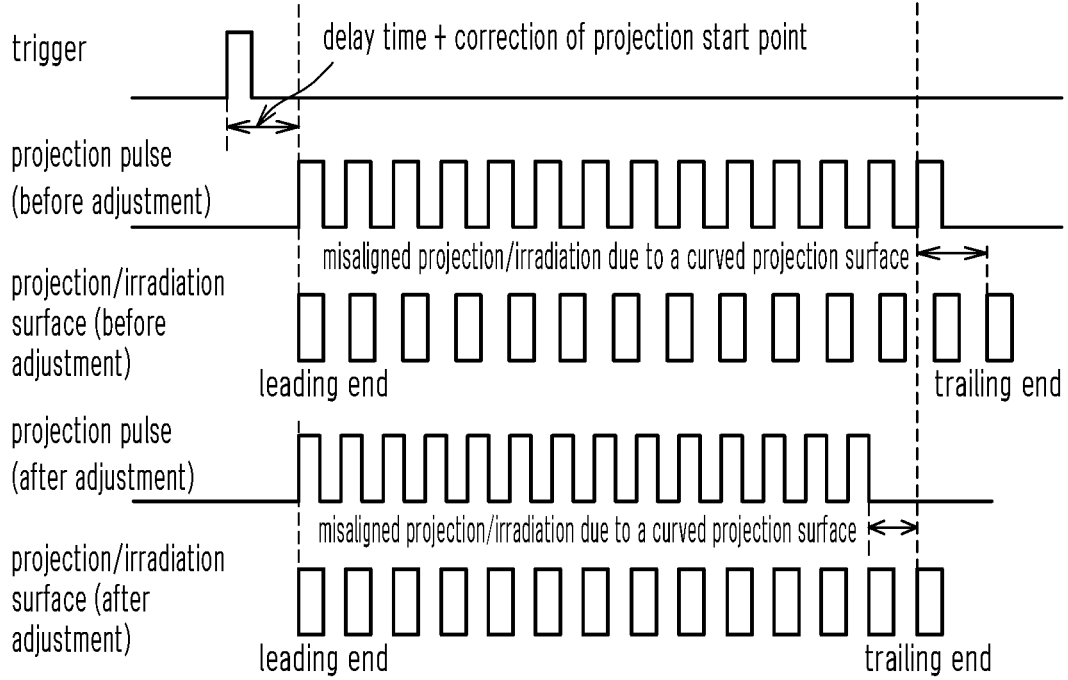
Figure 10:
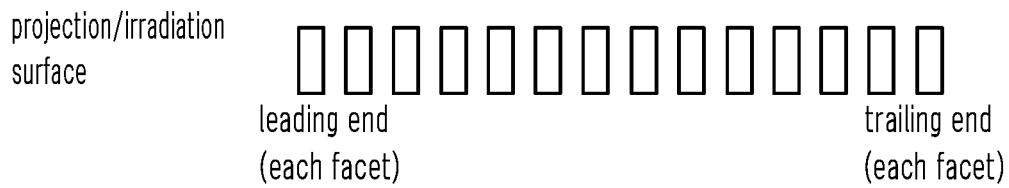

FIGS. 10(a)-10(c) are schematic diagrams showing the trigger timing, the pulse projection timing, the elapsed time (rotational angle), the positional relationship on the projection/irradiation surface, etc., in the case where the projection start points on the facets of the light-emitting mirror part 21 of the polygon mirror 20 are brought into alignment with each other by a delay process conducted after the trigger on each facet before the start of the output of the projection pulse train, where at least one facet is curved or otherwise uneven, and where the pulse cycle of the projection pulse train is changed.

The first facet (the mirror section 21a), as shown in FIG. 10(a), has the same pattern as the one in FIG. 9(a).

FIG. 10(b) concerns the case where any of the second and following facets (the mirror sections 21b-21d) is curved. As described with reference to FIG. 9(b), even though the projection start point and the projection end point of the projection pulse train on the curved facet are the same as the respective points on the first facet, the position of the trailing end of the light beam on the projection/irradiation surface may be different from the corresponding position on the first facet.

A mere shift of the position of the trailing end of the light beam can be conducted, for example, by re-adjustment of the delay time for the curved facet. However, such readjustment in turn shifts the leading end of the light beam again.

As an additional adjustment for shifting the position of the trailing end of the light beam, the pulse cycle of the projection pulse train is increased or decreased while the delay time for each facet is maintained. Specifically, for example, an operator actually projects a pulse laser beam on a white surface or the like, visually confirms the leading end and the trailing end of the light beam on each facet, and re-adjusts the delay time for each facet so as to align the trailing end with the others. Nevertheless, if this re-adjusted delay time is maintained, the leading ends of the light beams may be misaligned again. Hence, it is required to reset the delay time to the value before the re-adjustment, and to adjust (to increase or decrease) the pulse cycle by dividing the difference between the re-adjusted delay time and the value before the re-adjustment by the number of pulses in the projection pulse train and applying the obtained value to the pulse cycle. This arrangement can change the end timing of the output of the projection pulse train but does not change the start timing of its output. Preferably, the pulse width is kept unchanged.

For each facet of the light-emitting mirror part 21 of the polygon mirror 20, the above-described arrangement properly sets not only the delay time after the trigger before the start of the output of the projection pulse train, but also the pulse cycle of the projection pulse train. Eventually, despite a curve or other unevenness on any facet of the polygon mirror 20, light beams on the actual projection/irradiation surface can be aligned with each other.

The present invention can be embodied and practiced in other different forms without departing from the gist and essential characteristics of the present invention. Therefore, the above-described embodiments are considered in all respects as illustrative and not restrictive. The scope of the invention is indicated by the appended claims rather than by the foregoing description. All variations and modifications falling within the equivalency range of the appended claims are intended to be embraced therein.

The present application claims priority to Japanese Patent Application No. 2016-124867 filed on Jun. 23, 2016. The contents of this Japanese application are incorporated herein by reference. Further, any documents cited herein are specifically incorporated herein by reference in their entirety.

REFERENCE SIGNS LIST

100 laser scanning sensor
11 laser light-emitting element
12 light-receiving element
13 drive motor
14 encoder
20 polygon mirror
21 light-emitting mirror part
22 light-receiving mirror part
30 control/calculation unit

The invention claimed is:
1. A laser scanning sensor comprising:
a light-emitting element configured to emit a pulse laser beam;
a light-receiving element configured to receive a reflected beam of the pulse laser beam reflected by at least one or more objects;
a rotary polygon mirror having a plurality of reflecting surfaces configured to change a travelling direction of the pulse laser beam;
a driving part configured to rotate the rotary polygon mirror;
a rotation detecting part configured to detect a rotation status of the rotary polygon mirror and to generate, per rotation, at least one reference signal, and at least one trigger signal for each of the reflecting surfaces;
a control/calculation part configured to control the driving part, to produce a projection pulse train for driving the light-emitting element in a predetermined specific pulse cycle after passage of a delay time counted from the generation of the trigger signal for each of the reflecting surfaces that follows the generation of the reference signal, and to acquire information on a distance to the object, per each pulse of the pulse laser beam, based on a time after a—after start of emission of the pulse laser beam before a return of the reflected beam to the light-receiving element; and
a storage part configured to store the delay time and the specific pulse cycle,
wherein the delay time is set independently for each of the reflecting surfaces, and
wherein the laser scanning sensor is configured to obtain the delay time for each of the reflecting surfaces by subtracting a measured time lag from an initial delay time and to store the obtained delay time in the storage part, the measured time lag being a difference between a generation time of the trigger signal and a trigger reference time that comes when a standard time lag for each of the reflecting surfaces has passed since the generation of the reference signal.
2. The laser scanning sensor according to claim 1,
wherein the specific pulse cycle is set for each of the reflecting surfaces.
3. The laser scanning sensor according to claim 2,
wherein the laser scanning sensor is configured to obtain the delay time for each of the reflecting surfaces by subtracting the measured time lag from the delay time stored in the storage part and to store the obtained delay time in the storage part as a latest delay time, the measured time lag being the difference between the generation time of the trigger signal and the trigger reference time that comes when the standard time lag for each of the reflecting surfaces has passed since the generation of the reference signal.
4. The laser scanning sensor according to claim 1,
wherein the laser scanning sensor is configured to obtain the delay time for each of the reflecting surfaces by subtracting the measured time lag from the delay time stored in the storage part and to store the obtained delay time in the storage part as a latest delay time, the measured time lag being the difference between the generation time of the trigger signal and the trigger reference time that comes when the standard time lag for each of the reflecting surfaces has passed since the generation of the reference signal.
5. The laser scanning sensor according to claim 4,
wherein the laser scanning sensor is configured to adjust the pulse cycle for each of the reflecting surfaces, using a value obtained by a division wherein a difference between the delay times before and after the adjustment to align a trailing end of an irradiation position of the pulse laser beam is divided by a number of pulses in the projection pulse train.
6. The laser scanning sensor according to claim 1,
wherein the laser scanning sensor is configured to adjust the pulse cycle for each of the reflecting surfaces, using a value obtained by a division wherein a difference between the delay times before and after the adjustment to align a trailing end of an irradiation position of the pulse laser beam is divided by a number of pulses in the projection pulse train.

* * * * *